(12) United States Patent
Powers et al.

(10) Patent No.: US 7,915,531 B2
(45) Date of Patent: Mar. 29, 2011

(54) PUSHABLE CABLE

(75) Inventors: Wilber F. Powers, Newnan, GA (US); Stephen L. Spruell, Carrollton, GA (US); Ron J. Burchfield, Carrollton, GA (US)

(73) Assignee: Southwire Company, Carrollton, GA (US)

( * ) Notice: Subject to any disclaimer, the term of this patent is extended or adjusted under 35 U.S.C. 154(b) by 337 days.

(21) Appl. No.: 11/923,001

(22) Filed: Oct. 24, 2007

(65) Prior Publication Data

US 2008/0289854 A1    Nov. 27, 2008

Related U.S. Application Data

(60) Provisional application No. 60/939,153, filed on May 21, 2007.

(51) Int. Cl.
*H01B 7/00* (2006.01)
(52) U.S. Cl. .................................. 174/110 R; 174/36
(58) Field of Classification Search .............. 174/113 R, 174/110 R, 110 PM, 117 R, 117 F, 117 FF, 174/113 C, 36
See application file for complete search history.

(56) References Cited

U.S. PATENT DOCUMENTS

| | | | | |
|---|---|---|---|---|
| 3,015,969 A | * | 1/1962 | Bratz | 74/502.5 |
| 3,916,078 A | | 10/1975 | Priaroggia | 174/10 |
| 4,582,297 A | * | 4/1986 | Conti | 254/134.3 FT |
| 6,370,753 B1 | * | 4/2002 | Washburn | 29/407.01 |
| 7,272,284 B1 | * | 9/2007 | Pluister | 385/115 |
| 7,495,175 B2 | * | 2/2009 | Pluister | 174/113 R |
| 2008/0289855 A1 | | 11/2008 | Powers et al. | 174/135 |
| 2009/0107719 A1 | | 4/2009 | Powers et al. | |

FOREIGN PATENT DOCUMENTS

| | | |
|---|---|---|
| DE | 197 45 918 A1 | 1/1999 |
| FR | 2 660 790 | 10/1991 |
| JP | 8-75963 A * | 3/1996 |
| JP | 10-253860 | 9/1998 |
| JP | 11-18238 | 1/1999 |
| JP | 11-183765 | 7/1999 |
| JP | 2003-297151 A * | 10/2003 |
| WO | WO 99/51851 | 10/1999 |
| WO | WO 02/07929 A1 | 1/2002 |

OTHER PUBLICATIONS

International Search Report dated Jul. 20, 2009 cited in Application No. PCT/US2009/041099.
U.S. Appl. No. 12/106,377, filed Apr. 21, 2008 entitled "Pushable Cable".
U.S. Appl. No. 12/163,551, filed Jun. 27, 2008 entitled "Pushable Cable".
International Search Report dated Sep. 18, 2009 cited in Application No. PCT/US2009/047434.
International Search Report dated Oct. 20, 2008 cited in International Application No. PCT/US2008/064229.
U.S. Office Action dated Apr. 28, 2010 cited in U.S. Appl. No. 12/106,377.

(Continued)

*Primary Examiner* — William H Mayo, III
(74) *Attorney, Agent, or Firm* — Merchant & Gould

(57) ABSTRACT

A cable assembly may have a conductor core and a binding element. The binding elements may be configured helically around the conductor core. In addition, the binding element may be configured to, when the cable assembly is pushed through a conduit having at least one sweep, eliminate buckling of the cable assembly.

16 Claims, 4 Drawing Sheets

OTHER PUBLICATIONS

U.S. Office Action dated Apr. 28, 2010 cited in U.S. Appl. No. 12/163,551.
U.S. Final Office Action dated Oct. 21, 2010 cited in U.S. Appl. No. 12/106,377.
U.S. Final Office Action dated Nov. 10, 2010 cited in U.S. Appl. No. 12/163,551.
U.S. Final Office Action dated Feb. 1, 2011 cited in U.S. Appl. No. 12/106,377.

* cited by examiner

PUSHABLE CABLE

RELATED APPLICATION

Under provisions of 35 U.S.C. §119(e), Applicants claim the benefit of U.S. Provisional Application No. 60/939,153, filed May 21, 2007, which is incorporated herein by reference. The present application is related to U.S. patent application Ser. No. 12/106,377 and to U.S. patent application Ser. No. 12/163,551, both being assigned to the assignee of the present application.

COPYRIGHTS

All rights, including copyrights, in the material included herein are vested in and the property of the Applicants. The Applicants retain and reserve all rights in the material included herein, and grant permission to reproduce the material only in connection with reproduction of the granted patent and for no other purpose.

BACKGROUND

Electrical cables may be used to transfer power from an electrical distribution transformer. For example, 600V underground (UD) electrical cables are conventionally used to carry electrical power from the transformer to a meter box (e.g. on a building) by direct burying the UD electrical cables in the ground between the transformer to the meter box. In conventional systems, however, the UD electrical cable is sometimes pulled into a polyvinyl chloride (PVC) conduit or a polyethylene duct that is buried in the ground between the transformer and the meter box. Thus, the conventional strategy is to pull conventional UD electrical cables in a conduit that is buried in the ground between the transformer and the meter box. This often causes problems because the conventional strategy is time consuming because, in order to pull the conventional UD electrical cable through a conduit, a line must be "blown" through the conduit from one end to another using compressed air. Then the line must be used to pull a "pull rope" back through the conduit. Next, a "Kellum Grip" must be attached between an end of the conventional UD electrical cable and an end of the pull rope. Then the pull rope is pulled back through the conduit thus pulling the conventional UD electrical cable through the conduit.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

A cable assembly may be provided. The cable assembly may comprise a conductor core and a binding element. The binding element may be configured helically around the conductor core. In addition, the binding element may be configured to, when the cable assembly is pushed through a conduit having at least one sweep, eliminate buckling of the cable assembly. Moreover, the binding element may be configured to cause a first pushing force on the cable assembly having a magnitude less than a second pushing force on the cable assembly corresponding to pushing the cable assembly through the conduit without the binding element on the conductor core.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1A:
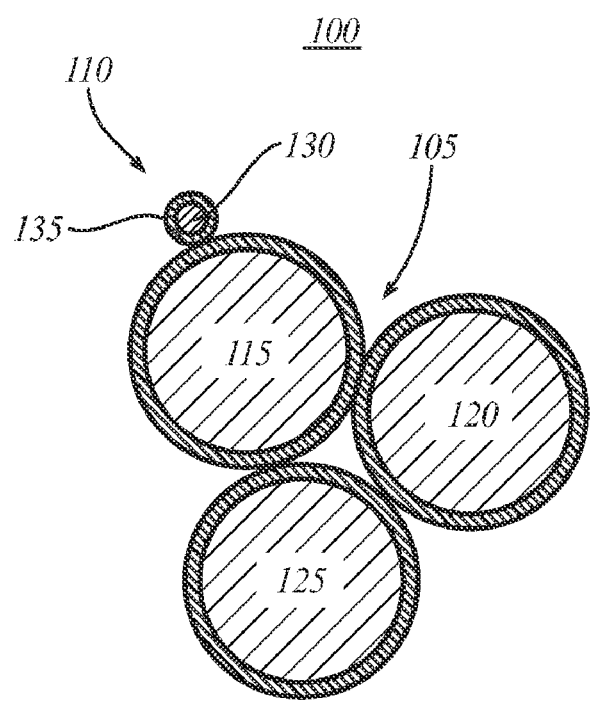
FIGS. 1A and 1B are diagrams of a pushable cable assembly.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

Consistent with embodiments of the invention, a cable assembly with a binding element (i.e. "skid wire") may be provided. The binding element (e.g. helically applied) may be configured to optimize pushing the cable assembly into a conduit or duct. Embodiments of the invention may aid in pushing the cable assembly into the conduit or duct with minimum force. Accordingly, a person or a mechanical capstan may be able to create enough force to push the cable assembly into the conduit or duct without the cable assembly "bird caging," buckling, or otherwise deforming. "Bird caging" may be characterized by conductors in a cable assembly fanning out due to a pushing (e.g. compressing) force being applied to the cable assembly to create a space in the cable assembly between the cable assembly's conductors that takes on a bird cage's characteristics. To minimize the pushing force and to limit the bird caging, buckling, or other deforming issues, a binding element (e.g. a helically applied outer wire) may be applied to the cable assembly's exterior.

Embodiments consistent with the invention may comprise a cable assembly. The cable assembly may comprise a conductor core comprising at least one conductor. In addition, the cable assembly may comprise a binding element configured helically around the conductor core. The binding element may be configured to, when the cable assembly is pushed through a conduit having at least one sweep: i) eliminate buckling of the cable assembly; and ii) cause a first pushing force on the cable assembly to have a magnitude less than a second pushing force on the cable assembly corresponding to pushing the cable assembly through the conduit without the binding element on the conductor core.

Figure 1B:
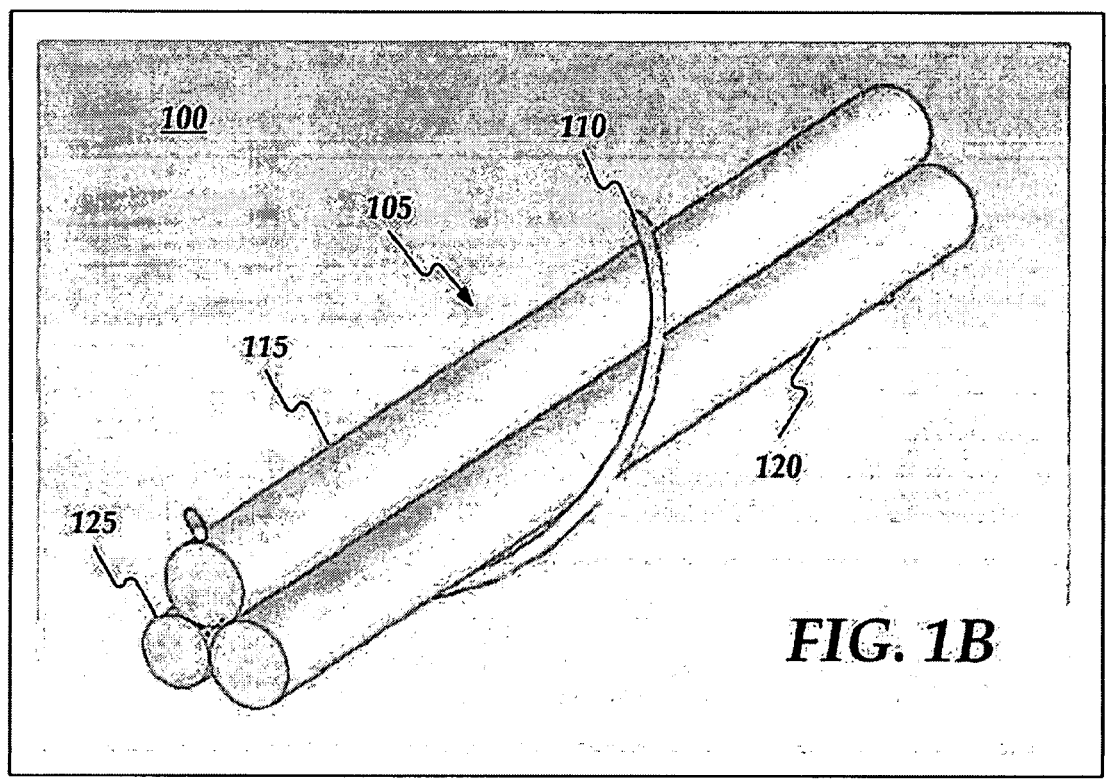

FIGS. 1A and 1B show a diagram of a pushable cable assembly 100. As shown in FIGS. 1A and 1B, assembly 100 may include a conductor core 105 and a binding element 110. Conductor core 105 may comprise a plurality of conductors (e.g. a first conductor 115, a second conductor 120, and a third conductor 125.) The plurality of conductors in conductor core 105 may be twisted in a "right-hand" lay, a "left-hand" lay, or may be in parallel without being twisted. Moreover, the plurality of conductors in conductor core 105 may be twisted in an alternating "right-hand" lay "left-hand" lay helix (or "S-Z" strand) to, for example, minimize stresses on conductor core 105.

The plurality of conductors may include any number of conductors (e.g. insulated or otherwise) and may include any number of ground wires or may not include a ground wire. Any one or more of the conductors in conductor core 105 may be configured to be a neutral wire, or none of the conductors in conductor core 105 may be configured to be a neutral wire. Any one or more of the conductors in conductor core 105 may have an insulation color indicating those any one or more of the conductors in conductor core 105 as a neutral(s). Furthermore the conductors in conductor core 105 may all be the same size or they may vary individually or in any sub-combination by size. In addition, the conductors in conductor core 105 may all be made of the same material (e.g. copper, aluminum, etc.) or they may vary individually or in any sub-combination by material. Also, the conductors in conductor core 105 may all be stranded or solid or they may vary individually or in any sub-combination by being stranded or solid.

Binding element 110 may be applied helically to the exterior of conductor core 105. Binding element 110 may be, but is not limited to, metallic, non-metallic, electrically conductive, or non-conductive materials. Binding element 110 may comprise, but is not limited to, a wire 130 that may be coated with a coating material 135. Wire 130 may comprise, but is not limited to, a metallic, non-metallic, electrically conductive, or non-conductive material. Coating material 135 may comprise, but is not limited to, polyethylene, polyvinyl chloride (PVC), or nylon. Binding element 110's cross-sectional shape may be, but is not limited to, circular, oval, or any other shape. Moreover, binding element 110 may also be optimized to be of adequate hardness so that it minimizes deformation to binding element 110 and therefore minimizes surface contact between binding element 110 and a surface that binding element 110 slides across.

Coating material 135 may comprise a sheath material introduced in pellet form to an extruder that heats and directs the sheath material onto wire 130. Consistent with embodiments of the invention, the sheath material may comprise a material (e.g. sheath pellets) having a lubricating material included in the sheath material. In other words, the sheath pellets may have the lubricating material formed directly in the sheath pellets. Or, when the sheath pellets do not have the lubricating material formed in the sheath pellets (i.e. lubricating-material-free sheath pellets), the lubricating material may be introduced into the extrusion process separately, for example, as separate lubricating material pellets. Consequently, the lubricating material pellets and the lubricating-material-free sheath pellets may be introduced into an extruder that heats, mixes, and directs the mixed material onto wire 130 to form coating material 135.

The lubricant material may comprise fatty amides, hydrocarbon oils, fluorinated organic resins, and mixtures thereof. Fatty amides and metallic fatty acids may include, but are not limited to, erucamide, oleamide, oleyl palmitamide, stearyl stearamide, stearamide, behenamide, ethylene bisstearamide, ethylene bisoleamide, stearyl erucamide, erucyl stearamide, and the like. Hydrocarbon oils may include, but are not limited to, mineral oil, silicone oil, and the like. Lubricating materials consistent with embodiments of the invention may include plasticizers, dibasic esters, silicones, anti-static amines, organic amines, ethanolamides, mono- and di-glyceride fatty amines, ethoxylated fatty amines, fatty acids, zinc stearate, stearic acids, palmitic acids, calcium stearate, lead stearate, sulfates such as zinc sulfate, etc., and the like. The above lubricating materials may be used individually or in combination. Furthermore, lubricating materials may include fluorinated organic resins, such as a polymer of one or more fluorinated monomers selected from tetrafluoroethylene, vinylidene fluoride, chlorotrifluoroethylene, and the like. The fluorinated resin may be used in a powder, emulsion, or aqueous dispersion.

Binding element 110 may be made of two pieces (e.g. wire 130 and coating material 135), may be one piece, or in any other construction. Consistent with embodiments of the invention, once pushable cable assembly 100 is constructed, the lubricating material may bloom, migrate toward binding element 110's exterior, and permeate binding element 110. Binding element 110 may be porous, thus enabling the lubricating material to migrate toward binding element 110's exterior surface. Binding element 110's exterior may contain sufficient lubricating material to provide an exterior surface with a reduced coefficient of friction. In other words, binding element 110 may comprise or otherwise include any material that may be configured to cause a low or lessened coefficient of friction between cable assembly 100 and a conduit or duct. For example, the coating material may excrete or leach a lubricant.

To limit the bird caging, buckling, or other deforming issues, binding element 110 may be configured to hold or otherwise bind cable assembly 100's conductor core 105 together. For example, binding element 110 may be sufficient to hold conductor core 105's plurality of conductors together at least in the presence of a force sufficient to push cable assembly 100 through a conduit or duct. For example, the aforementioned force may comprise a force applied by a person continuously pushing several hundred feet of cable assembly 100 through a conduit or duct between an electrical transformer and a meter box mounted to a building. The conduit or duct may have a sweep (e.g. a sweeping bend in the conduit or duct of approximately ninety-degrees or otherwise.) Accordingly, binding element 110 may be configured to hold or otherwise bind conductor core 105's conductors together in the presence of at least this type of force, for example.

Furthermore, binding element 110 may be applied to conductor core 105's exterior in order to minimize the aforementioned pushing force. Binding element 110 may be configured to contact the conduit or duct during a pushing installation process. Consequently, binding element 110 may minimize the pushing force by lessening the friction between assembly 100 and the conduit or duct. In other words, binding element 110 may cause less friction between cable assembly 100's exterior and the conduit or duct than would be present if cable assembly 100 was pushed through the conduit or duct without binding element 110. For example, binding element 110 may reduce this frictional force between cable assembly 100's exterior and the conduit or duct down to a level that a person could continuously push several hundred feet of cable assembly 100 through the conduit or duct between an electrical transformer and a meter base.

Moreover, binding element 110 may enable this low frictional force even when at least one sweep is present in the conduit or duct between the electrical transformer and the meter box. For example, binding element 110 may provide a plurality (e.g. three or more) of contact points that, in most cases, may prevent conductor core 105's conductors from contacting any portion of the conduit or duct during entrance and exit of a sweep during the aforementioned pushing process. As stated above, to minimize the pushing force and to limit bird caging, buckling, or other deformation issues, binding element 110 may be applied to conductor core 105's exterior. Binding element 110 may be helically applied to conductor core 105's exterior. Moreover, binding element 110's helical lay length may be optimized (or fall within an optimal range) for best results in minimizing the pushing force and to limiting the bird caging, buckling, or other deforming issues. For example, binding element 110's helical lay length may fall within an optimal range to provide, for example, three or more points of contact that may prevent conductor core 105's conductors from contacting any portion of the conduit or duct during entrance and exit of a sweep (e.g. sweeping ninety-degree bend) during the aforementioned pushing process. A bending radius of the sweep, the conduits or duct's diameter, and other geometric constraints may be considered when optimizing the lay length. For example, the lay length may fall between approximately three to twelve inches and may be 6.5 inches. Moreover, binding element 110's helical lay length may fall within an optimal range in order to keep the conductors from bird caging, buckling, or having other deforming issues when a compressive force is applied to cable assembly 100 during the aforementioned pushing installation process.

Figure 2:
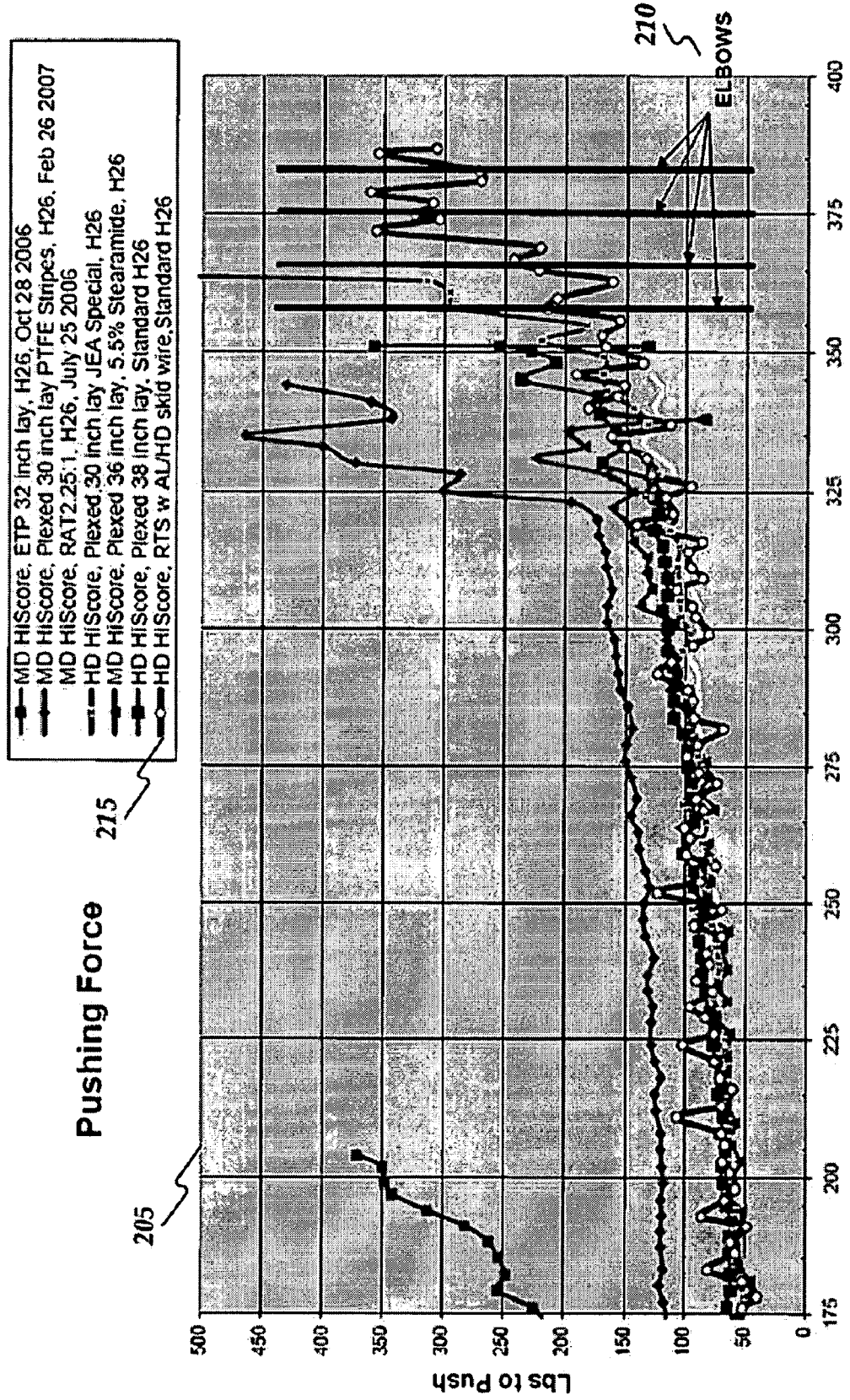
FIG. 2 shows a graph illustrating pushing forces.

FIG. 2 shows a graph 205 illustrating pushing forces. For example, graph 205 illustrates an operational example of forces that may be required to push cables through a two inch diameter PVC conduit system over the length of the conduit system with conventional cables. Vertical black bars 210 correspond to approximately ninety-degree sweeps. Element 215 (the "HD HiScore, RTS w AL/HD skid wire, Standard H26" that is the bottom line in the legend designates the cable assembly with the helical applied outer wire) in graph 205 may correspond to embodiments of the present invention using binding element 110 (i.e. skid wire.) As shown in graph 205, the force to push through all four of the ninety-degree sweeps (shown as vertical black bars 210) at the end of the run is much less for element 215 than any of the other conventional sample cables compared. As shown in the FIG. 2 example, no more than 243 lbs. of force was needed to push 367 feet of cable through a conduit including two ninety-degree sweeps. In addition, FIG. 2 example shows no more than 362 lbs. of force was needed to push 379 feet of cable through a conduit including three ninety-degree sweeps. In this operational example, all of the other conventional sample cables "stalled out" a mechanical pushing device, which explains the abrupt end of data on the graph lines corresponding to the conventional sample cables.

Figure 3:
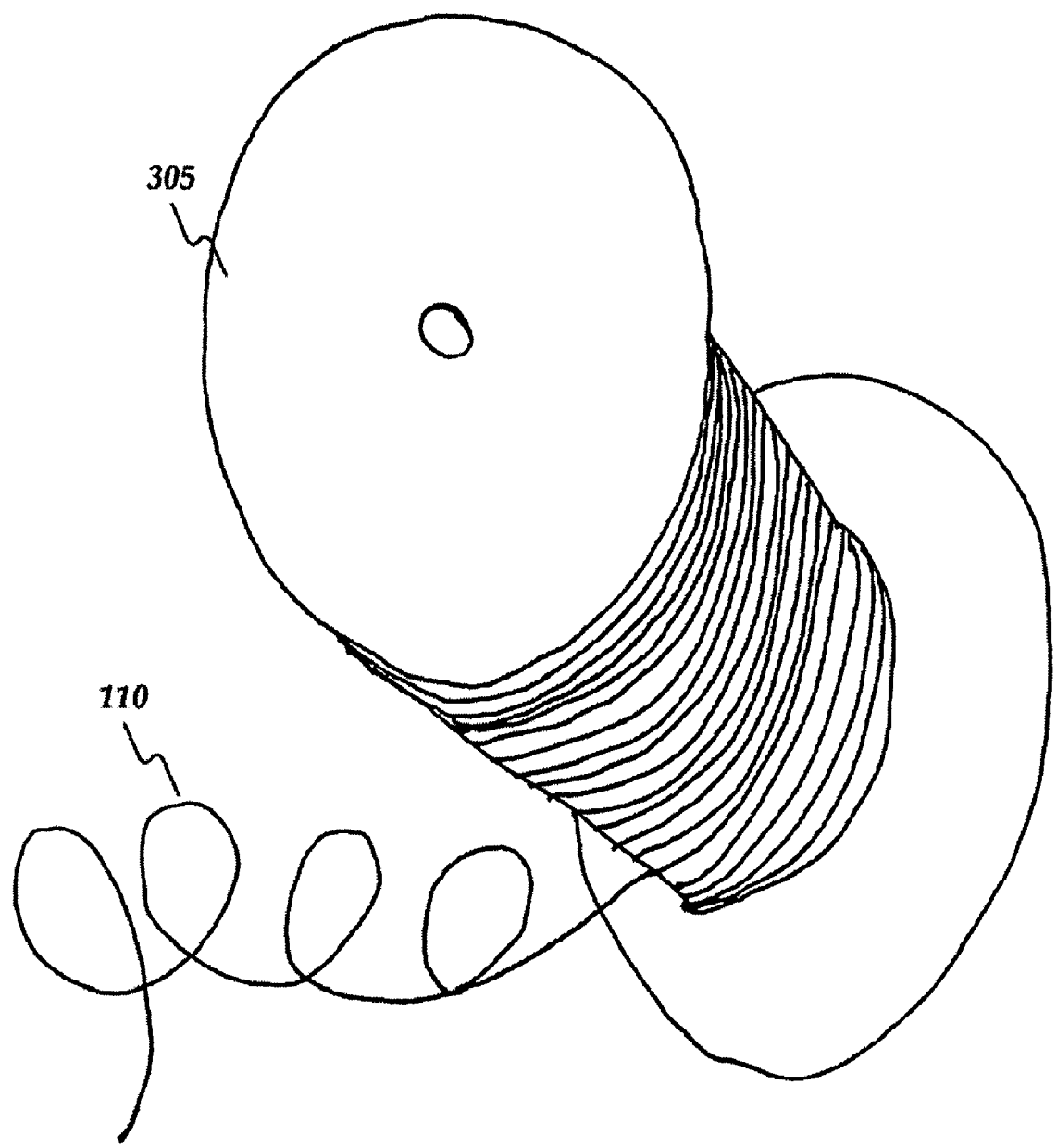
FIG. 3 shows a binding element reel.

FIG. 3 shows a binding element reel 305. As shown in FIG. 3, binding element 110 may be placed on binding element reel 305 prior to binding element 110 being applied to conductor core 105. Consistent with embodiments of the invention, binding element 110 may have an elastic or resilient memory. For example, while on binding element reel 305, binding element 110 may be helical with a first radius. However, when binding element 110 is removed from (or paid off) binding element reel 305, binding element 110 may remain helical, but may return to a second radius. The second radius may be smaller than the first radius. In other words, when removed from binding element reel 305, binding element 110 may change from a helix with a larger radius to a helix with a smaller radius due to having an elastic or resilient memory.

When constructing cable assembly 100, binding element 110 may be paid off binding element reel 305 and applied to a length of conductor core 105. When a sufficient amount of binding element 110 is paid off binding element reel 305, binding element 110 may be cut with a first portion of binding element 110 having been place on conductor core 105 and a second portion of binding element 110 remaining on binding element reel 305. In this way, binding element 110 may be applied to conductor core 105. Due to binding element 110's aforementioned elastic or resilient memory characteristic, when binding element 110 is cut during the aforementioned application process, binding element 110 may tend to draw tightly to conductor core 105 rather than fanning out or "bird caging." In other words, due to binding element 110 having the aforementioned resilient memory characteristic, binding element 110 may fit snuggly around conductor core 105 once binding element 110 is paid off binding element reel 305, applied to conductor core 105, and cut.

While certain embodiments of the invention have been described, other embodiments may exist. Further, any disclosed methods' stages may be modified in any manner, including by reordering stages and/or inserting or deleting stages, without departing from the invention. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A cable assembly comprising:
a conductor core; and
a binding element configured helically around the conductor core, the binding element configured to, when the cable assembly is pushed through a conduit having at least one sweep, eliminate buckling of the cable assembly and cause a first pushing force on the cable assembly having a magnitude less than a second pushing force on the cable assembly corresponding to pushing the cable assembly through the conduit without the binding element on the conductor core, wherein the binding element comprises:
a substantially round wire, and
a coating material extruded around the substantially round wire configured to cause the binding element to have a substantially round cross-section and configured to cause the substantially round wire to be substantially at the center of the binding element, the coating material including a lubricating material configured to migrate or permeate toward an exterior of the coating material and to excrete onto an exterior surface of the binding element, wherein the exterior surface of the binding element having the excreted lubricating material is in contact with and configured helically around the conductor core.

2. The cable assembly of claim 1, wherein the binding element has a resilient memory characteristic configured to cause the binding element to fit snuggly around the conductor core.

3. The cable assembly of claim 1, wherein the conductor core comprises at least one electrical conductor.

4. The cable assembly of claim 1, wherein the conductor core comprises at least two electrical conductors twisted in one of the following lays: "right-hand" lay, "left-hand" lay, and S—Z strand.

5. The cable assembly of claim 1, wherein the binding element is of sufficient hardness so that the binding element is substantially un-deformation when the cable assembly is pushed through the conduit.

6. The cable assembly of claim 1, wherein the least one sweep is substantially ninety degrees.

7. The cable assembly of claim 1, wherein the first pushing force is between 5 pounds and 200 pounds and pushes the cable assembly through at least 340 feet of the conduit containing at least two sweeps.

8. The cable assembly of claim 1, wherein the first pushing force is between 5 pounds and 200 pounds and pushes the cable assembly through at least 340 feet of the conduit containing at least three sweeps.

9. The cable assembly of claim 1, wherein a lay length of the binding element helically around the conductor is between three and twelve inches.

10. A cable assembly comprising:
a conductor core; and
a binding element placed around the conductor core, the binding element configured to provide a plurality of contact points between the binding element and a conduit when the cable assembly is pushed through the conduit having at least one sweep, the binding element having a lay length configured to cause the binding element to prevent contact between the conductor core and an interior of the sweep wherein the binding element comprises:
a substantially round wire, and
a coating material extruded around the wire configured to cause the binding element to have a substantially round cross-section and configured to cause the substantially round wire to be substantially at the center of the binding element, the coating material including a lubricating material configured to excrete onto an exterior surface of the binding element, wherein the exterior surface of the binding element having the excreted lubricating material is helically around and in contact with the conductor core.

11. The cable assembly of claim 10, wherein the lay length of the binding element is between three and twelve inches.

12. The cable assembly of claim 10, wherein the lay length of the binding element is approximately 6.5 inches.

13. The cable assembly of claim 10, wherein the binding element is of sufficient hardness so that the binding element is substantially un-deformed when the cable assembly is pushed through the conduit.

14. A cable assembly comprising:
a conductor core; and
a binding element configured helically around the conductor core, the binding element configured to allow a force of between 5 pounds and 200 pounds push the cable assembly through at least 340 feet of conduit containing at least two sweeps wherein the binding element comprises;
a wire, and
a coating material extruded around the wire configured to cause the wire to be substantially at the center of the binding element, the coating material including a lubricating material configured to excrete onto an exterior surface of the binding element, wherein the exterior surface of the binding element having the excreted lubricating material is in contact with the conductor core.

15. The cable assembly of claim 10, wherein the lay length of the binding element is configured to cause at least three points of contacts between the binding element and the interior of the sweep.

16. The cable assembly of claim 10, wherein the lay length of the binding element is configured to cause at least three points of contacts between the binding element and the interior of the sweep comprising approximately 90 degrees.

* * * * *